Nov. 23, 1943.  C. B. MALONE  2,334,942
LUBRICATION SYSTEM
Filed June 20, 1941
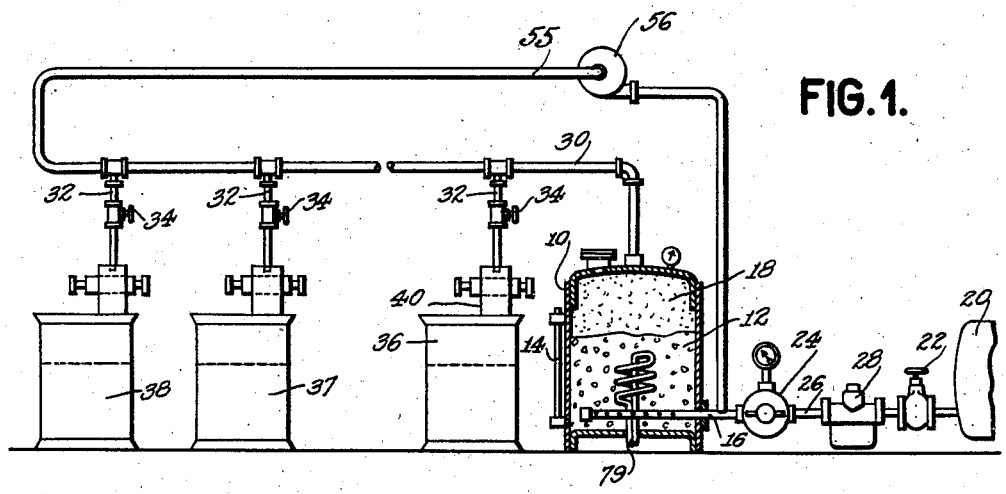
FIG. 1.
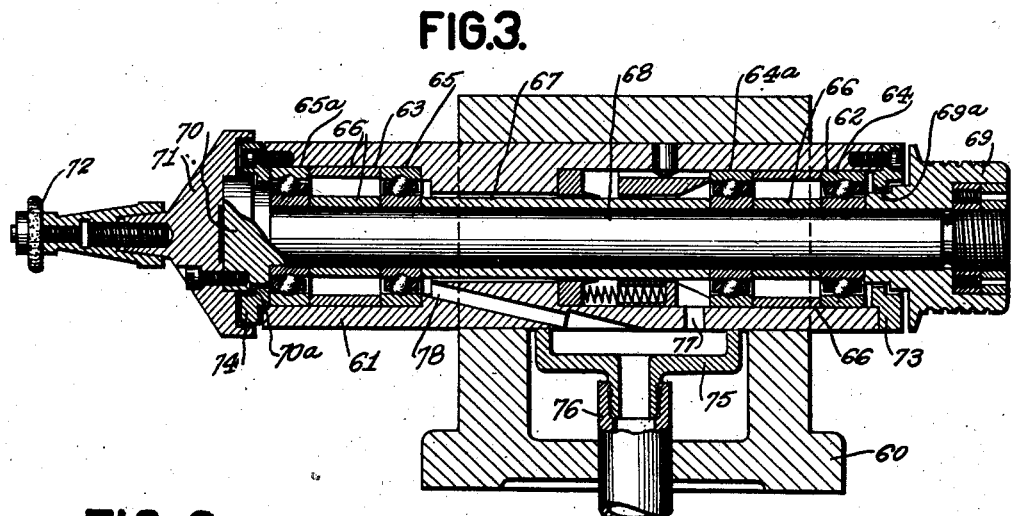
FIG. 3.
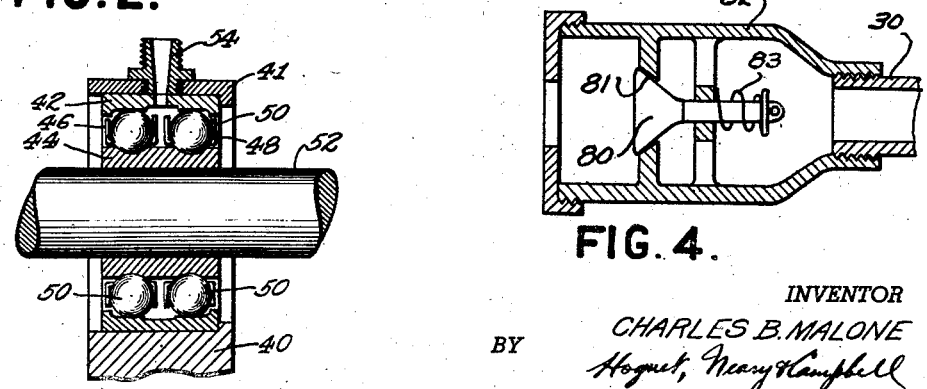
FIG. 2.
FIG. 4.
INVENTOR
CHARLES B. MALONE
BY Hoguet, Neary & Campbell
ATTORNEYS Patented Nov. 23, 1943

2,334,942

UNITED STATES PATENT OFFICE 2,334,942

LUBRICATION SYSTEM

Charles B. Malone, Stamford, Conn., assignor to Hopewood Manufacturing Company, Springdale, Conn., a partnership consisting of Charles B. Malone and Helen S. Malone Application June 20, 1941, Serial No. 398,875

6 Claims. (Cl. 184—7)

This invention relates to lubrication systems and more particularly to a method of and apparatus for developing and conveying a mist of liquid lubricant to machines employing anti-friction bearings and other lubricatable parts.

Anti-fritcion bearings, such as the ball and roller types, are usually employed to support shafts and spindles where efficient and/or high speed operations are required. The lubrication of such bearings presents certain problems. The amount of oil fed to such a bearing, for example, is usually difficult to control; too much oil will cause the bearing to run hot and too little may cause the bearing to burn out. This problem of controlling the feed of lubricant is rendered even more difficult when a machine or gang of machines employs a large number of such bearings. Then again, dust and grit, if allowed to work into an anti-friction bearing, will reduce the efficiency and life of the bearing. This latter problem is of particular concern in the operation of grinding machines and the like where dust and fine particles of metal or other substances are contained in the air and/or grinding solution surrounding the machine.

One of the objects and features of the present invention, therefore, is to provide a method of and apparatus for developing and feeding a stream of air or other suitable gas laden with finely divided particles of a liquid lubricant to anti-friction bearings and the like.

Another feature of the invention is to provide an economical method of and apparatus for developing a mist of a liquid lubricant at a central point and conveying the mist to a plurality of lubrication points.

Still another feature of the invention is to provide a method of and apparatus for developing and forcing a mist of oil or other liquid lubricant into an anti-friction or other type of bearing in a manner to maintain the bearing supplied with lubricant and to maintain it cool and free from dirt and grit.

The above and additional objects and features of the invention will become more apparent upon consideration of the following detailed description, when read in connection with the accompanying drawing, in which:

Figure 1 is a schematic illustration of a lubrication apparatus by which the method of the present invention can be practiced;

Figure 2 is a vertical sectional view of a ball bearing provided with a form of connection through which a lubricating mist can be supplied in accordance with the principles of the invention;

Figure 3 is a vertical sectional view of a grinding spindle provided with a form of connection through which the lubricant mist can be delivered to the bearings, thereof; and Figure 4 is a view partly in section of a typical form of bleeder valve construction suitable for use for maintaining a pressure differential in the lubrication system.

Referring to Figure 1 of the drawing, a form of lubricating apparatus is illustrated schematically by which the method of the present invention can be carried out. The system comprises a tank 10 adapted to contain a body of a liquid lubricant 12, such as oil, the amount of which is indicated by a gauge 14. A perforated pipe or other suitably shaped member 16 is located adjacent the bottom of the tank through which a gas, such as air, is forced for passage through the oil 12 to develop above the level of the oil an oil mist 18. The gas may be supplied directly from a suitable compressor or from a pressure tank 20. The supply of gas is controlled by a hand valve 22 and a pressure regulator 24. The pressure regulator is adapted to maintain the pressure within the tank 10 substantially constant. To insure the gas being clean, the supply line 26 is provided with a filter 28.

The oil mist 18 is delivered from the tank 10 to a plurality of lubricating points through a manifold 30 having a plurality of connections 32. Each of the connections 32 is provided with a hand valve 34 to control the amount of oil mist delivered to the lubricating point with which the connection is associated.

The lubrication system illustrated in Figure 1 is shown to be associated with a number of machines having rotating machine elements requiring lubrication, such as, for example, the grinding devices 36, 37 and 38. Each grinding device is provided with a bearing support 40 which, as shown fragmentarily in Figure 2, may comprise a housing 41 for a ball bearing which comprises outer and inner races 42 and 44, ball cages 46 and 48, and a plurality of balls 50. The shaft or spindle 52 of the grinder is supported by the inner race 44.

This form of ball bearing may be lubricated by oil mist fed through a coupling 54 threadedly received in an opening in the housing 41 located between the race-ways for the two rows of balls 50. The oil laden air introduced through the coupling 54 spreads as it enters the space between the inner and outer races and flows axially thereof about the balls 50. The finely divided particles of oil entrained by the air are deposited on the surfaces of the races, balls and other parts of the bearing. The flow of air axially between the inner and outer races expels dust and dirt therefrom and prevents the infiltration thereto of fine particles of metal or other substance liberated by the grinding or other machine operations. The amount of oil laden air and the force of the flow thereof to and through the bearing may be determined by the setting of the regulating valve 24 and of the hand valve 34. While the ball bearing illustrated in Figure 2 is of the double-row type, it will be understood that it is shown for the purpose of illustrating the invention only and that the lubricant developing and feeding principles of my invention may be associated with other types of bearings and machine parts as well.

In order to maintain a pressure differential between the supply tank 10 and the points to be lubricated so as to insure a continuous flow of the air borne oil, the manifold 30 may be provided with a return by-pass connection 55. This by-pass 55 may be connected to the supply line 26 between the pressure regulator 24 and the tank 10, or the return may be connected to the tank independently of the supply line either below or above the level of the body of lubricant. A booster pump 56 is employed to return the mist to the supply pipe 16. In some instances, however, the return connection 55 and the booster 56 may be replaced with a suitable bleeder valve providing for the necessary pressure differential as when several of the valves 34 are closed or nearly so.

The bleeder valve may be any desired type of loaded valve. As shown in Figure 4, the bleeder valve may include a valve 80 that is normally urged into a valve seat 81 in a casing 82 by means of a spring 83. The casing 82 is secured to the end of the manifold 30. The valve 80 is displaced from the seat 81 to permit air to escape when the back pressure in the manifold 30 increases. The function of the valve is to maintain a sufficiently rapid flow of air through the manifold and through the tank to form the mist and to entrain and carry the oil as mist to the bearings. Thus, when one or more of the valves 34 is closed, the valve tends to open because of the pressure of the gas thereon and compensates for the diminished flow of air through the bearings.

Referring to Figure 3, a modified form of grinding spindle is shown to illustrate another form of connection through which the oil mist can be delivered into the bearing. The grinder spindle illustrated includes a spindle holder base 60 in which is mounted a generally cylindrical spindle housing 61 having enlarged cavities 62 and 63 for receiving the pairs of ball bearings 64, 64a and 65 and 65a. The bearings of each pair are maintained in spaced apart relationship by means of annular spacer sleeves 66 and the pairs of bearings are moreover retained in spaced relationship by means of a spacer sleeve 67 engaging the inner races of the bearings 64a and 65.

The grinder spindle 68 is mounted in the inner races of the ball bearings 64, 64a, 65 and 65a and the inner spacer sleeves 66 and 67. At the right hand end of the spindle 68 is a drive pulley 69 which engages the inner race of the bearing 64. The other end of the spindle 68 has an enlarged head 70 which engages the inner race of the bearing 65a and carries the adaptor 71 for receiving various types of grinding stones 72.

The inner ends of the pulley 69 and the enlarged head 70 are provided with stepped portions 69a and 70a, respectively, which cooperate with complementally stepped covers 73 and 74, respectively, fastened to the ends of the spindle housing 61 to form a labyrinth which tends to prevent metal particles and dirt from entering the bearings.

The spindle holder base 61 is provided with a chamber 75 having a coupling 76 thereon which is connected to the manifold 30. The chamber 75 is in communication with a pair of conduits 77 and 78 in the spindle housing 61 which extend from the outer surface of the housing 61 to adjacent the bearings 64a and 65.

With this construction the oil mist may be fed to the inner bearings 64a and 65, by the gaseous flow to the outer bearings 64 and 65a, and outward to the atmosphere through the labyrinths at the ends of the spindle 68. The gas tends to blow dirt and grindings and the grinding solution away from the bearings, thereby keeping them clean and prolonging their operating lives.

While I prefer to form the lubricating mist at room temperatures, it may, in some cases, be desirable to use the lubricant as a coolant. In this case, the body of lubricant 12, may be chilled by means of a cooling coil 79 disposed in the tank 10 or by suitable refrigerating jackets on the tank 10 or manifold 30.

While my method of developing and conveying lubricant in the form of a mist to a plurality of lubricating points will be apparent from the foregoing description, the method may be summarized briefly as follows: Air or other gas is first filtered and bubbled at a predetermined pressure through a body of the lubricant. The bubbles passing through the lubricant entrain finely divided particles of the lubricant to form a mist. The mist thus formed is conveyed adjacent a plurality of lubricating points where a part or all of the mist can be diverted for passage into a bearing or other machine part. The inner surfaces of the bearing are adequately lubricated by the finely divided particles of lubricant and at the same time are maintained cool and clean of dirt and grit by the flow of air through the bearing. This method is of particular advantage where a large number of bearings or other lubricating points require a relatively small continuous supply of lubricant and where dust and dirt are apt to filter into the machine parts.

While I have shown and described but one form of apparatus and two different forms of bearing connections with which my method may be practiced, I recognize that many variations in both the apparatus and the method are possible without departing from the spirit of the invention. It is therefore to be understood that the method and apparatus shown and described are to be regarded as illustrative of the invention only and not in restriction thereof.

I claim:

1. A lubrication system comprising means to develop a mist of liquid lubricant, a manifold including a plurality of connections through which said mist can be delivered to a plurality of lubricating points, means to control the flow through each of said connections and means communicating with said manifold beyond said connections for maintaining a continuous flow of said mist through said manifold.

2. A lubrication system comprising a manifold, means to develop and maintain a supply of lubricant mist for delivery through said manifold, a return connection from said manifold to said source of supply, and a pump in said return connection to insure a continuous flow of mist through said manifold.

3. A lubrication system comprising a tank adapted to contain a body of oil, a hollow perforated member disposed in said tank adjacent the bottom thereof, means to feed air at a predetermined pressure through said member for passage through the body of oil to develop an oil mist, a manifold for receiving said oil mist, a conduit connected to said manifold to convey the oil mist from said manifold to a lubricating point and means communicating with said manifold at a point beyond said conduit in the direction of flow of said mist for maintaining a constant flow of said mist through said manifold.

4. A lubrication system comprising a tank adapted to contain a body of oil, means to introduce air into the tank at a predetermined pressure for passage through said body of oil to develop an oil mist, means to convey the oil mist to a lubricating point, and a return connection including a pump to maintain a continuous flow of oil mist through the conveying means.

5. A lubrication system comprising means for developing a mist of liquid lubricant and entraining said mist in a gas under pressure, a manifold including a plurality of connections through which said mist can be delivered with said gas to a plurality of lubricating points, means to control the flow through each of said connections, and a bleeder valve in said manifold beyond said connections for maintaining a substantially uniform differential between the pressure of the gas in said manifold and the pressure at said lubricating points to maintain a uniform flow of gas and mist through said lubricating points.

6. A lubrication system comprising means to develop and entrain a mist of liquid lubricant in a gas under pressure, a manifold for receiving said gas and entrained mist and conveying them to a plurality of bearings through which said gas can escape to create a differential between the pressure of said gas in said manifold and the pressure at said bearings, means for controlling the flow of gas from said manifold to each of said bearings, and means connected to said manifold for maintaining said pressure differential substantially constant regardless of variations in the flow of gas through said bearings to assure a substantially uniform flow of gas-borne lubricant through said manifold.

CHARLES B. MALONE.